(12) United States Patent
Walz

(10) Patent No.: US 6,434,912 B1
(45) Date of Patent: Aug. 20, 2002

(54) APPARATUS FOR DEPOSITING GROUPS OF EDGEWISE STANDING, FLAT ITEMS INTO CONTAINERS

(75) Inventor: Theo Walz, Neunkirch (CH)

(73) Assignee: SIG Pack System AG, Beringen (CH)

( * ) Notice: Subject to any disclaimer, the term of this patent is extended or adjusted under 35 U.S.C. 154(b) by 0 days.

(21) Appl. No.: 09/644,046

(22) Filed: Aug. 23, 2000

(30) Foreign Application Priority Data

Aug. 23, 1999 (CH) .............................................. 1542/99

(51) Int. Cl.⁷ .............................................. B65B 35/30
(52) U.S. Cl. ..................... 53/247; 198/418.6; 198/463.4
(58) Field of Search ........................... 198/418.6, 463.4, 198/624; 53/247, 248, 251

(56) References Cited

U.S. PATENT DOCUMENTS

| | | | | |
|---|---|---|---|---|
| 3,777,453 A | * | 12/1973 | Zimmermannet et al. ...... | 53/251 |
| 4,048,784 A | * | 9/1977 | Toby .............................. | 53/77 |
| 4,066,174 A | * | 1/1978 | Collins et al. ................... | 214/7 |
| 4,520,614 A | * | 6/1985 | Aykut et al. .................... | 53/540 |
| 5,410,859 A | * | 5/1995 | Kresak et al. ................. | 53/537 |
| 5,675,963 A | * | 10/1997 | Nicholson et al. ............. | 53/540 |
| 5,733,088 A | * | 3/1998 | Kerrien et al. ............... | 414/146 |
| 6,052,969 A | * | 4/2000 | Hart et al. ...................... | 53/447 |
| 6,286,290 B1 | * | 4/2000 | Fluck ............................. | 53/54 |

FOREIGN PATENT DOCUMENTS

CH  568 905  11/1975

\* cited by examiner

*Primary Examiner*—Kenneth W. Noland
*Assistant Examiner*—Rashmi Sharma
(74) *Attorney, Agent, or Firm*—Venable; Gabor J. Kelemen

(57) ABSTRACT

An apparatus for depositing a group of stacked, edge-wise standing flat items into a container includes a support for engaging opposite ends of the group; an arrangement for adjusting the support to the group length; a first holding unit; a second holding unit; and a drive for moving the first and second holding units in a first path along which one of the first and second holding units holds and lowers the group and for moving the first and second holding units in a second path along which one of the first and second holding units releases the group for allowing the group to fall and the other of the first and second holding units guides and pushes the group at an upper portion thereof downwardly into the container. The second path adjoins the first path and is situated thereunder.

13 Claims, 3 Drawing Sheets

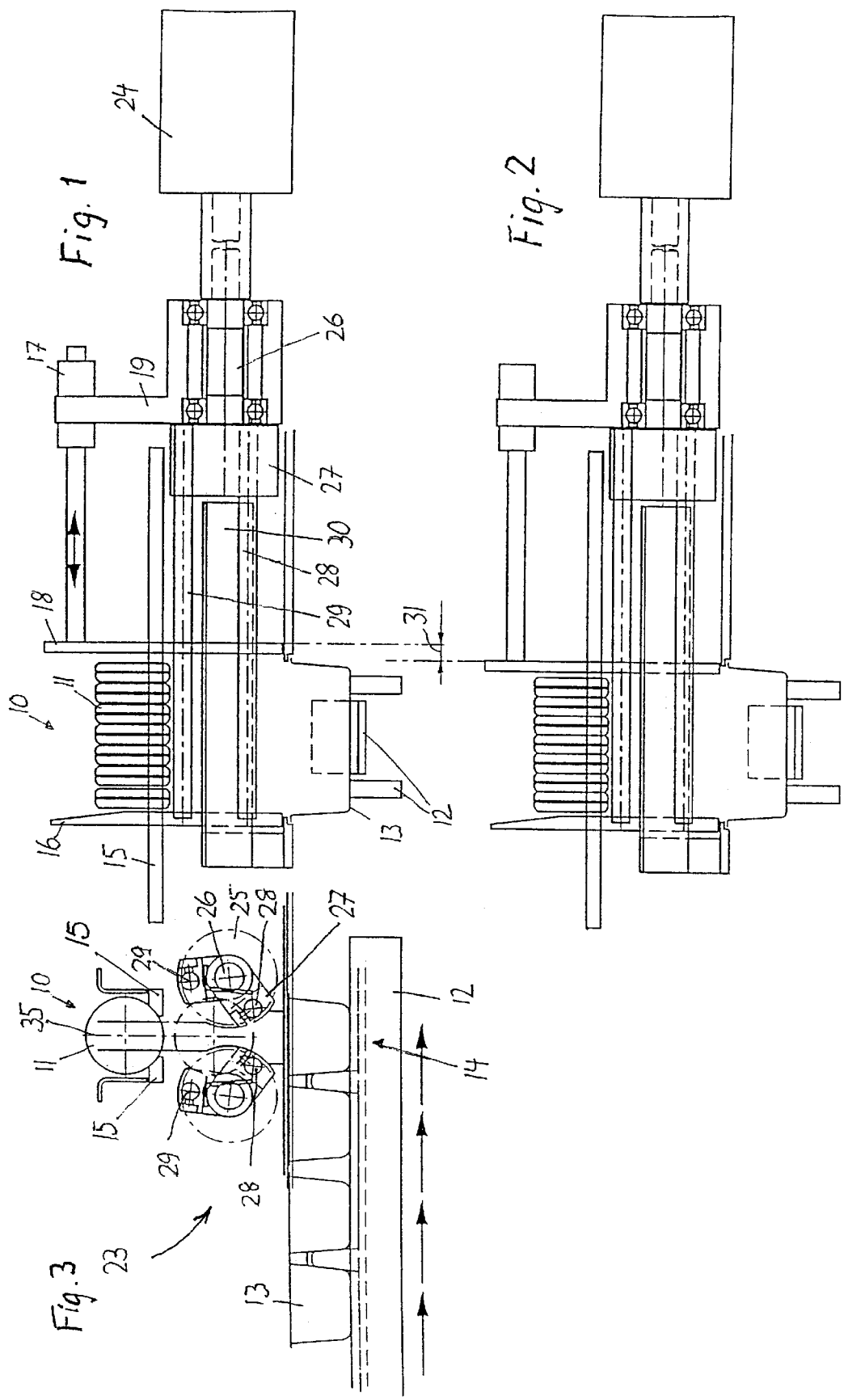

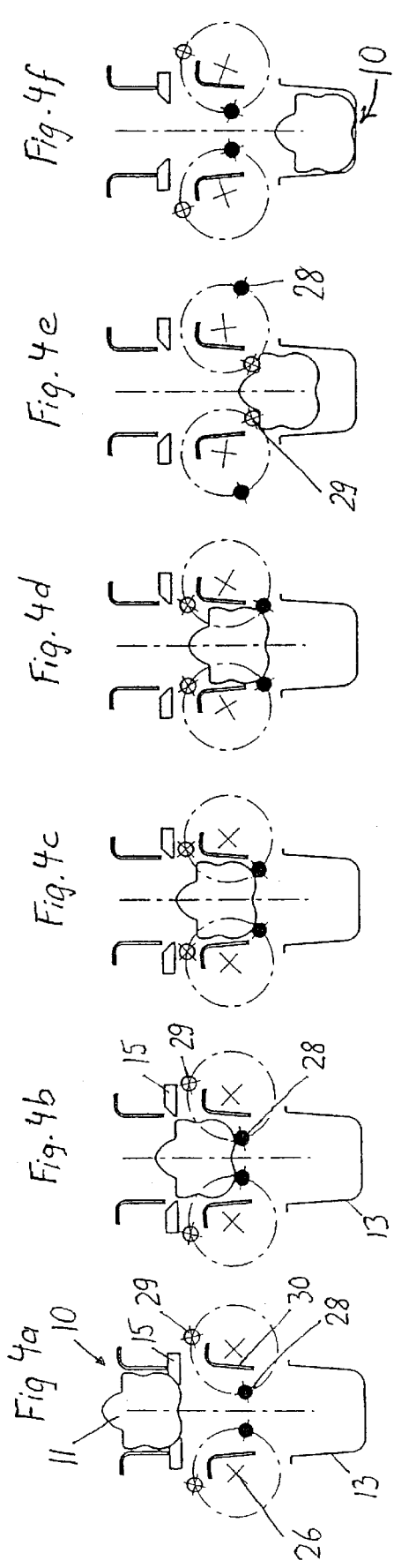
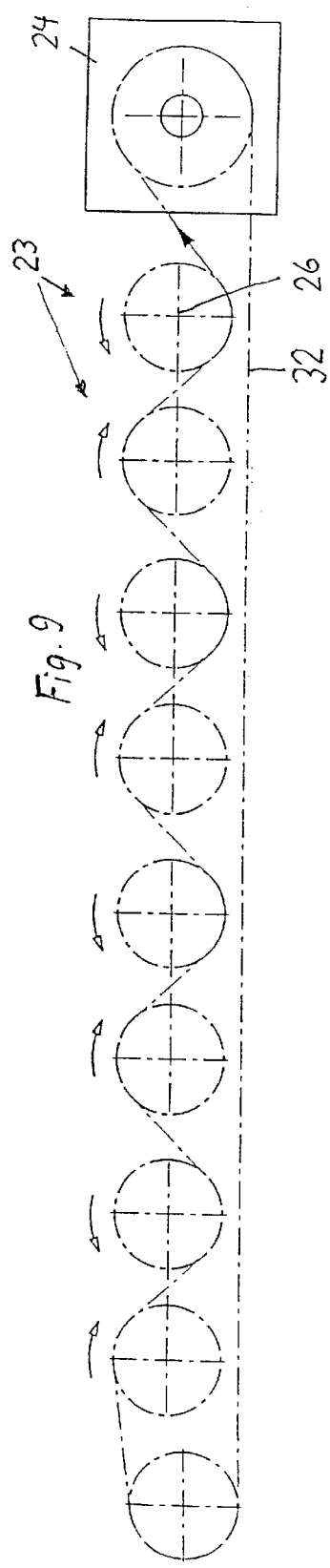

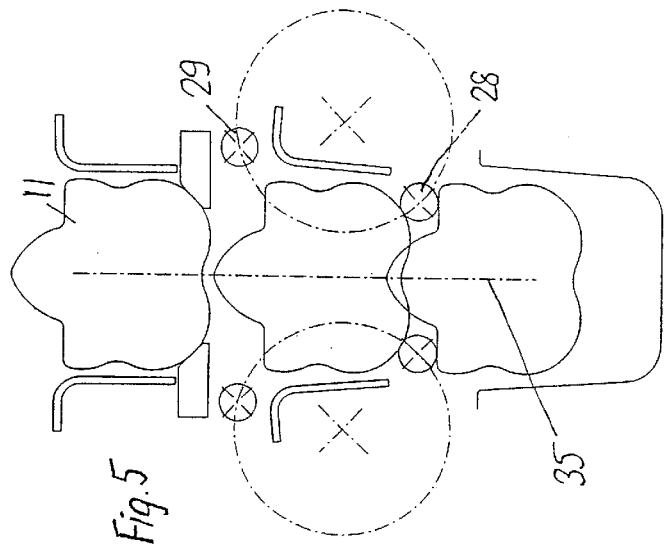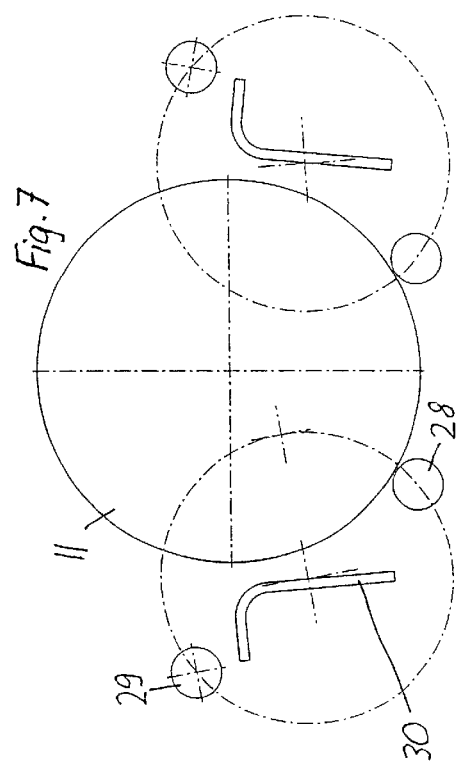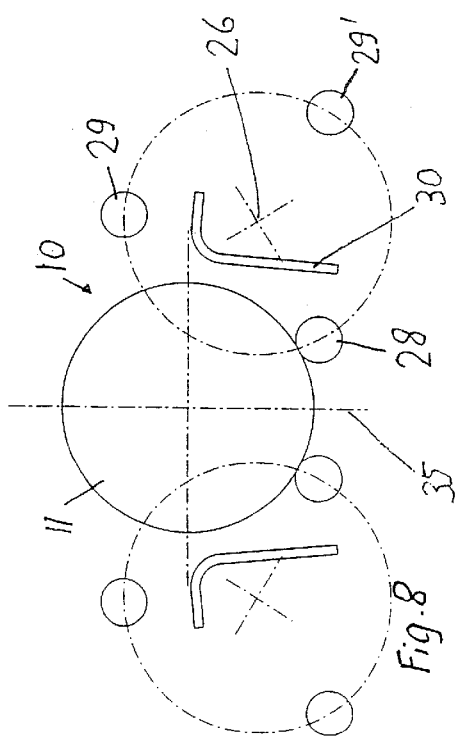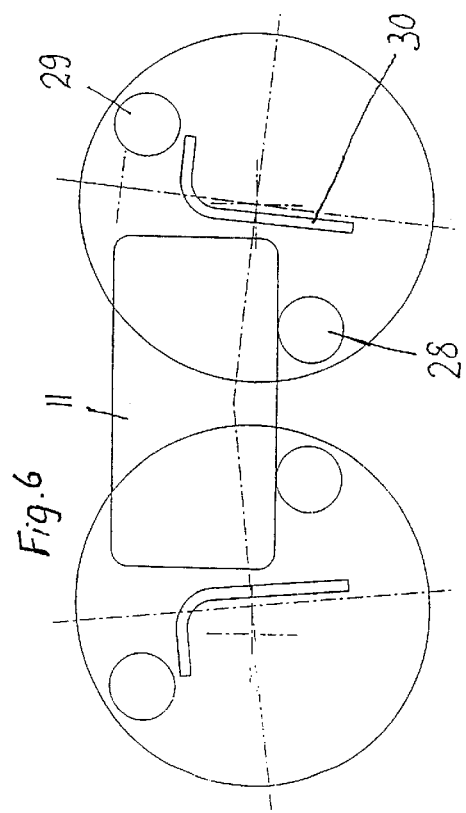

APPARATUS FOR DEPOSITING GROUPS OF EDGEWISE STANDING, FLAT ITEMS INTO CONTAINERS

CROSS REFERENCE TO RELATED APPLICATION

This application claims the priority of Swiss Application No. 1542/99 filed Aug. 23, 1999, which is incorporated herein by reference.

BACKGROUND OF THE INVENTION

Swiss Patent No. 568,905, to which corresponds U.S. Pat. No. 3,930,572, describes an apparatus for forming groups of face-to-face oriented, flat, edgewise upstanding products, particularly confectionery items such as cookies or wafers. The group separated from a long stack of articles is carried on two bars. After lowering the bars into a horizontal position they are moved away from one another so that the group falls onto a pusher situated under the bars.

SUMMARY OF THE INVENTION

It is an object of the invention to provide an improved apparatus of the above-outlined type with which groups of face-to-face engaging flat items may be deposited in containers with high reliability.

This object and others to become apparent as the specification progresses, are accomplished by the invention, according to which, briefly stated, the apparatus for depositing a group of stacked, edgewise standing flat items into a container includes a support for engaging opposite ends of the group; an arrangement for adjusting the support to the group length; a first holding unit; a second holding unit; and a drive for moving the first and second holding units in a first path along which one of the first and second holding units holds and lowers the group and for moving the first and second holding units in a second path along which the one of the first and second holding units releases the group for allowing the group to fall and the other of the first and second holding units guides and pushes the group at an upper portion thereof downwardly into the container. The second path adjoins the first path and is situated thereunder.

BRIEF DESCRIPTION OF THE DRAWINGS

FIGS. 1 and 2 are schematic side elevational views of a preferred embodiment of the apparatus according to the invention, illustrating two operational positions.

FIG. 3 is a schematic front elevational view of the structure shown in FIGS. 1 and 2.

FIGS. 4a–4f are schematic front elevational views of one portion of the structure shown in FIG. 3, illustrating sequential operational positions.

FIGS. 5, 6, 7 and 8 are schematic front elevational views of four variants.

FIG. 9 is a schematic front elevational view of a preferred embodiment having a plurality of side-by-side arranged item group charging stations.

DESCRIPTION OF THE PREFERRED EMBODIMENTS

The apparatus illustrated in FIGS. 1–5 includes a non-illustrated supply conveyor for groups 10 of edgewise standing, face-to-face engaging flat items 11, such as confectionery items, for example, cookies or wafers. The supply conveyor may be of the type described in the above-identified Swiss Patent No. 568,905. The containers (trays) 13 to be charged with the items are advanced on a further conveyor 12 into a loading position 14 underneath two facing carrier bars 15 of the group 10. The stack constituting the group 10 is supported at opposite stack ends by a horizontally adjustable backup wall 16 and a guiding wall 18 movable by a linear motor 17 having stroke feedback means. The group 10 is centered precisely above the opening of the container 13. The linear motor 17 is secured to a housing 19.

The apparatus further includes a transporting device 23 having two shafts 26 which are rotatably supported in the housing 19 and which are driven in opposite directions by a common servomotor 24 via a gearing 25. Carrier arms 27 are mounted on the shafts 26 and are angularly adjustable relative to the respective shaft axes. The carrier arms 27 carry holding bars 28, 29 which are oriented parallel to the shaft axes and to the carrier bars 15.

Laterally adjustable guides 30 are mounted on the housing 19 within the circulating path of the bars 28, 29. The guides 30 are angularly bent plates extending parallel to the carrier bars 15. The shafts 26 and the circulating paths of the bars 28, 29 are disposed symmetrically to a vertical central plane 35 which passes through the group 10 (that is, midway between the two shafts 26).

For charging the container 13 with the group 10, first the group 10 is positioned above the container 30 by the carrier bars 15 as the group 10 rests thereon, as shown in FIG. 4a. Thereafter the carrier bars 15 are laterally moved away from one another as shown in FIG. 4b so that the group 10 falls on the lower bars 28 while being guided by the plates 30. At the same time, as shown in FIG. 1, the guiding wall 18 is shifted by a distance 31 such that, as shown in FIG. 2, the group 10 will be centered accurately above the container 13. As the next step, the shafts 26 are rotated in opposite directions (FIGS. 4c, 4d and 4e) such that first the group 10 is lowered with the orbiting bars 28 as seen from a comparison of FIGS. 4b and 4c and then the bars 28 slide laterally away from underneath the group 10, as seen from a comparison of FIGS. 4c and 4d. In case an item 11 becomes slightly wedged on the container walls, it is pushed thereinto by the bars 29 co-circulating with the bars 28, as shown in FIG. 4e. Thereafter, as shown in FIG. 4f, the group 10 assumes its position in the container 13, the shafts 26 are rotated back into their basic or initial position and the support bars 15 are moved toward one another. A new empty container 13 is brought under the transporting device 23, and a new group 10 is positioned on the support bars 15 (FIG. 4a) for repeating the charging cycle.

With the described apparatus according to the invention containers may be reliably charged with item groups with a very small waste rate, a high output and a gentle handling of the items. The apparatus according to the invention is of simple structure and is inexpensive to build and operate.

FIG. 6 illustrates the apparatus during the charging of items 11 shaped differently from those shown in the previous Figures. As seen, the guide plates 30 and the angular position of the bars 28, 29 with respect to one another are set differently than in the illustration according to FIG. 5. FIG. 7 illustrates a variant in which the bars 28, 29 are offset 180° with respect to one another relative to the shaft axes and function alternatingly as supporting bars and pusher bars. Each shaft 26 thus rotates 180° and always in the same direction. This variant has the advantage that the control device for operating the motor 24 is simplified. In the variant shown in FIG. 8 the same principle is implemented, except that three support and pusher bars 28, 29 and 29' per shaft 26 are used.

FIG. 9 shows a variant in which a plurality of transporting devices 23 are arranged side-by-side for the simultaneous charging of several side-by-side arranged containers. All the shafts 26 are driven by a common double-sided tooth belt 32 from a common servo motor 24. With this variant a significant output increase may be achieved with a relatively modest outlay.

It will be understood that the above description of the present invention is susceptible to various modifications, changes and adaptations, and the same are intended to be comprehended within the meaning and range of equivalents of the appended claims.

What is claimed is:

1. An apparatus for depositing a group of stacked, edgewise standing flat items into a container, comprising
   (a) support means for engaging opposite ends of the group;
   (b) means for adjusting said support means to a length of the group;
   (c) a first holding unit;
   (d) a second holding unit; and
   (e) drive means for moving said first and second holding units in a first path along which one of said first and second holding units holds and lowers the group and for moving said first and second holding units in a second path along which said one of said first and second holding units releases the group for allowing the group to fall and the other of said first and second holding units guides and pushes the group at an upper portion thereof downwardly into the container; said second path adjoining said first path and situated under said first path.

2. The apparatus as defined in claim 1, wherein said first and second holding units comprise holding bars.

3. The apparatus as defined in claim 1, wherein said first and second paths together form an arc.

4. The apparatus as defined in claim 1, further comprising lateral guide means for guiding the group along opposite sides thereof.

5. The apparatus as defined in claim 1, wherein said drive means comprises a servomotor.

6. The apparatus as defined in claim 1, wherein said drive means comprises a motor and a toothed belt operatively connected to said motor and said first and second holding units.

7. The apparatus as defined in claim 1, wherein said first and second holding units form part of a transporting device; further wherein said transporting device is provided in a plurality and the transporting devices are disposed side-by-side for simultaneously charging a plurality of containers with a plurality of item groups.

8. The apparatus as defined in claim 1, further comprising means for moving said first and second holding units in a closed path; said first and second paths forming parts of said closed path.

9. The apparatus as defined in claim 8, further wherein said first holding unit comprises a first and a second holding member and said second holding unit comprises a third and a fourth holding member; further comprising a first component carrying said first and third holding members and a second component spaced from said first component and carrying said second and fourth holding members; and means for moving said first and second components in unison for effecting a motion of said first, second, third and fourth holding members in a respective said closed path.

10. The apparatus as defined in claim 9, wherein the closed path described by said first and third holding members and motions of said first and third holding members are symmetrical to the closed path described by said second and fourth holding members and to motions of said second and fourth holding members with respect to a vertical plane positioned between said first and second components.

11. The apparatus as defined in claim 9, wherein the closed paths are circular and further wherein said first and second components are rotary components.

12. The apparatus as defined in claim 10, further comprising means for adjusting said first and third holding members with respect to one another on said first component.

13. The apparatus as defined in claim 10, further comprising means for adjusting said second and fourth holding members with respect to one another on said second component.

* * * * *